United States Patent [19]
de la Salle

[11] Patent Number: 6,144,961
[45] Date of Patent: *Nov. 7, 2000

[54] METHOD AND SYSTEM FOR NON-INTRUSIVE MEASUREMENT OF TRANSACTION RESPONSE TIMES ON A NETWORK

[75] Inventor: Pierre de la Salle, Palo Alto, Calif.

[73] Assignee: Compuware Corporation, Farmington Hills, Mich.

[*] Notice: This patent issued on a continued prosecution application filed under 37 CFR 1.53(d), and is subject to the twenty year patent term provisions of 35 U.S.C. 154(a)(2).

[21] Appl. No.: 08/822,306

[22] Filed: Mar. 21, 1997

Related U.S. Application Data

[63] Continuation-in-part of application No. 08/522,433, Aug. 31, 1995, abandoned.

[51] Int. Cl.[7] .................................................. G06F 17/30
[52] U.S. Cl. .................... 707/10; 707/104; 395/200.57; 395/200.54
[58] Field of Search .................. 395/200.54, 200.57; 707/10, 104

[56] References Cited

U.S. PATENT DOCUMENTS

| | | | |
|---|---|---|---|
| 4,363,093 | 12/1982 | Davis et al. | 364/200 |
| 5,090,013 | 2/1992 | Fadem | 370/85.8 |
| 5,121,486 | 6/1992 | Kurihara et al. | 395/325 |
| 5,128,925 | 7/1992 | Dorsstetter et al. | 370/17 |
| 5,131,084 | 7/1992 | Kasashima et al. | 395/325 |
| 5,193,188 | 3/1993 | Franaszek et al. | 395/650 |
| 5,200,952 | 4/1993 | Bernstein et al. | 370/79 |
| 5,253,252 | 10/1993 | Tobol | 379/85.5 |
| 5,402,394 | 3/1995 | Turski | 368/10 |
| 5,483,674 | 1/1996 | Cimet | 455/56.1 |
| 5,535,214 | 7/1996 | Shiobara | 370/85.6 |
| 5,550,873 | 8/1996 | Dolev | 375/354 |
| 5,600,638 | 2/1997 | Bertin et al. | 370/351 |
| 5,600,808 | 2/1997 | Kasukawa | 395/672 |
| 5,694,612 | 12/1997 | Garmire et al. | 395/800 |
| 5,745,758 | 4/1998 | Shaw et al. | 395/672 |
| 5,764,912 | 6/1998 | Rosborough | 395/200.54 |
| 5,796,953 | 8/1998 | Zey | 395/200.57 |
| 5,862,335 | 1/1999 | Welch, Jr. et al. | 395/200.54 |

OTHER PUBLICATIONS

Hewlett–Packard Company and International Business Machines Inc., Application Response Measurement API Guide, First Edition, Jun. 1996 pp. 1–17.

*Primary Examiner*—Thomas G. Black
*Assistant Examiner*—Frantz Coby
*Attorney, Agent, or Firm*—Fenwick & West, L.L.P.

[57] ABSTRACT

A network monitoring and management system (10) is provided for use in conjunction with a computer network array (12) including a plurality of identifiable branch arrays known as LANS (14). The system (10) includes a sampling assembly () including a plurality of probe computers (42) situated along selected ones of the LANS (14) for "capturing" data packets (22) and building probe objects (52) corresponding thereto. The system (10) further includes an analysis assembly () including a database computer (98) for receiving a plurality of probe objects (52) and manipulating them with a database builder routine (96) into database objects (100), which are stored in a database (99). The database (99) is then subject to analysis routines in a database management system (138) which extract and display information relating to the operational parameters of the computer network array (12), including a network map (144), a plurality of conversation path maps (150) and performance specifications. The overall system (10) is utilized by network managers to analyze, optimize and "tune" the network application performance. The system (10) is used to measure a transaction response time of a transaction on a distributed application in a way which is non-intrusive to the application by examining data packets for the presence or absence of session layer data.

16 Claims, 7 Drawing Sheets

METHOD AND SYSTEM FOR NON-INTRUSIVE MEASUREMENT OF TRANSACTION RESPONSE TIMES ON A NETWORK

RELATED PATENT APPLICATION

This patent application is a continuation-in-part of U.S. patent application Ser. No. 08/522,433, filed on Aug. 31, 1995, entitled "Network Monitoring and Management System" and now abandoned.

BACKGROUND OF THE INVENTION

1. Field of the Invention

The present invention relates generally to the field of computer interconnection and networking, and more particularly to an improved method for monitoring, identifying the configuration of and managing extremely large computer networks. Still more particularly, the present invention provides a method and system for measuring a transaction response time on a computer network.

2. Description of the Related Art

The interconnection of computers into large operational groups, simulating semi-independent but concerted action of human groups, is becoming increasingly prevalent, and increasingly important. With the introduction of powerful small computers, it has become recognized that decentralized computing is more efficient and cost effective than older centralized (mainframe) computing methods. Furthermore, a growing number of uses for computers appears to be the trend for the present and the future, with many of these uses requiring or involving communication and interaction between computers, both in localized areas and in remote locations. The method which is generally recognized today as being most efficient is to interconnect various independent computing units and peripherals (of any of a huge number of types and functions) into operational groupings known as "networks". Networks come in wide varieties, as well, being defined by the bus type (e.g. Ethernet, Token Ring, etc.) or by the extent of the configuration (e.g. local area, enterprise, metropolitan and global networks). All of these require management and optimization to best serve the needs of the user.

Only a short whole ago even the most complex computer networks were small enough to be fairly easily managed. A typical Local Area Network ("LAN") was situated in a single building or office and contained a relatively small number of workstations, with a single server controlling everything. A person, known as a "network manager", would be fully familiar with all of the components and programming and would be able to recognize situations and problems very efficiently, based on this familiarity. However, even though LANs remain common, today's computer networks are often so expansive and varied that a network manager has difficulty even keeping track of all of the devices connected to the network, let alone determining an optimal configuration for such a network. Increasingly, networks are connected to other networks to form expansive and complex computer interconnection schemes, sometimes having even a worldwide scope. In such complex networks, changes, due to failed or added equipment, new users, or changing applications as a few examples, may be made at the far reaches of the computer network on, essentially, a daily basis.

As one skilled in network management will realize, a primary task is to keep track of the actual configuration of the network and, following that, to reconfigure or otherwise optimize or "tune" the network, as necessary, so as to minimize problems and maximize the utilization of resources. Having recognized a need for tools to assist network managers in the task of monitoring large networks, inventors have developed several tools for the purpose.

A Simple Network Management Protocol ("SNMP") standard has been developed, and continues to be refined, for defining types of data necessary for network management. A part of the SNMP is a Management Information Base ("MIB"), which includes information relating to the number of processors running on a network, number of collision packets detected, and the like. A Remote Network Monitoring Information Base ("RMON") is a standard protocol for use in networking management and related activities. U.S. Pat. No. 5,315,580 issued to Phaal teaches a network monitoring device and system for monitoring the activity on a network, such as might be used to collect data according to the RMON standard. The Phaal system includes means for selecting a theoretically representative number of message packets and a processing means for collecting data related to such message packets.

An Open Systems Interconnection ("OSI") model describes a way to encapsulate data in packets in an effort toward standardizing data packet forms. The OSI standard divides packet information into seven general layers (see Table 1, below). The layers generally refer to the sequence of data information within each packet. The OSI reference model is utilized to generally indicate the type of information contained in data packets sent over network systems, but is not universally utilized, nor is the use consistent for all types of networks. To the inventor's knowledge, however, the OSI model has not been implemented in its entirety. Indeed, data portions which fall within the higher levels of the OSI standard are located and/or formatted quite differently according

TABLE 1

OSI Reference Model

| Layer Number | Content |
| --- | --- |
| 1 | Physical |
| 2 | Data Link |
| 3 | Network |
| 4 | Transport |
| 5 | Session |
| 6 | Presentation |
| 7 | Application | to device and network protocol. The OSI model does, however, provide a reference that is generally accurate.

The RMON protocol deals, generally, with information contained in the second OSI layer types. Other layers, as will be discussed later, include information reflecting other characteristics of the data packet.

While the prior art systems are relatively effective at informing a network manager about the configuration of a network, there is a great paucity of information concerning the efficiency of the network and even less information which might help the manager in improving such efficiency. Moreover, the inability to integrate information, which might otherwise be helpful, from different device types has presented an even more formidable barrier to the manager's tasks.

To the inventor's knowledge, prior to the present invention, no means has existed in the art for remotely obtaining information from a widely dispersed network having therein a variety of device types and sub-network configurations, which information will be sufficient to inform a manager not only about the configuration of the network, but also about the operation, efficiency, and problem areas within the network. All prior methods and means by which network managers could obtain information about the network could obtain only superficial data about the network configuration and/or could not function to full effect where various equipment types (such as both Apple™ computers and IBM™ compatible computers) and/or various sub-network types (such as Novell™ and AppleTalk™) are interconnected. Much room exists for more efficient, more inclusive and more user-friendly systems for monitoring and managing complex network arrays.

A type of information which is particularly helpful to a network manager in improving network efficiency is the transaction response time of an application distributed throughout a widely dispersed network. Portions of such an application are usually executed on device types within the network such as personal computers (PC) or workstations, and other portions of the same application are usually executed on other network device types such as servers. The application is typically of the data-acquisition type involving a client PC sending a transaction to a server in order to access and utilize data stored on the server. The total response time for such a transaction is equal to the difference between the point in time a user initially sends a screen of data to the server and the point in time at which the user receives a new screen of data. Currently, there are only a few tools for measuring the transaction response time, and none of these tools, to the inventor's knowledge, are "non-intrusive" tools. A "non-intrusive" tool is one which does not require the applications on the network to be modified and re-compiled in order for transaction response times to be measured.

An example of an "intrusive" tool for measuring a transaction response time is described in a document called "Application Response Measurement, API Guide," published jointly by Hewlett-Packard Co. and International Business Machines, Inc., in June 1996. As stated on page iii of the guide, it is "intended for the application programmer who wants to know how to instrument an application for transaction monitoring using the standard Application Response Measurement (ARM) API function calls." This tool requires each application on the network to be modified and re-compiled to include special functions for sending a token packet on the network which, when detected, assists in measuring a transaction response time. Thus, this tool requires significant changes to all applications on the network in order for transaction response times to be measured. Such changes may cause subsequent problems in the applications since new errors and software bugs may be introduced during the necessary modifications and re-compilations of the applications.

SUMMARY OF THE INVENTION

Accordingly, it is an object of the present invention to provide a means and method for easily determining the configuration of an expansive network.

It is another object of the present invention to provide a means and method for ascertaining a network configuration and functionality which does not interfere with or slow the operation of the network.

It is still another object of the present invention to provide a means and method for remotely determining the functional and performance aspects of a computer network.

It is another object of the invention to provide a monitoring and management system which compiles network parameter information in a convenient format for analysis.

It is a further object of the invention to provide network configuration and operational parameter information in a dynamic fashion, while retaining historical information, as well.

It is yet another object of the present invention to provide a means and method for determining information about a network which can 'see through' routers and similar devices, thereby providing accurate information even concerning network array branches and segments which are not directly probed or sampled.

It is still another object of the present invention to provide a means and method for assisting in network management which is relatively inexpensive in proportion to the size of the network.

It is a further object of the present invention to provide a means and method for obtaining network data which is not prone to inaccurate information.

It is yet a further object of the present invention to provide a means and method for measuring a transaction response time of a distributed application in a way which is non-intrusive to the application.

Briefly, the preferred embodiment of the present invention is a network monitoring and management system and method having a sampling assembly including a plurality of probe units distributed throughout a network, with the probe units being situated on different branches of the overall network array such that "geographically" distinct information is gathered. The probe units sample data packets and process the packet information into discrete predefined "probe objects", which correlate to the packet information. The probe unit accomplishes this by collecting packets into a buffer for a specified period of time (a "time slice") and then extracting the information from the collected packets to create the probe objects, each of which contains at least data related to source, destination, and time for response. Although the collected packets may be in different formats and have different types of information therein, the probe objects are of a standard format.

The packet information received from the data packets may be further analyzed by a routine to determine the transaction response time of a distributed application. The routine first determines the beginning of the transaction by detecting the initial presence of a data packet containing session layer data. The routine then detects an absence of OSI session layer data on the sampled data packets for a predetermined amount of time, and defines the end of the transaction as the point in time that the predetermined amount of time began. The routine then calculates the transaction response time as the difference between the beginning and the end of the transaction.

Periodically, or upon the request of the network manager, the probe objects are transmitted to an analysis assembly within the system. The analysis assembly primarily includes a "data base builder" computer, provided with software to process, categorize and store the probe objects and/or the summarized content thereof. The data base builder, using the probe objects in a unique manner "builds" the network configuration and operational parameters and provides information relating thereto to the network manager.

An advantage of the present invention is that it can act in a "passive" mode, without sending out frequent query messages which only add traffic onto a network.

Another advantage of the present invention is that it provides much information about system performance and problem areas which was either not obtainable by prior methods or else which was not obtainable remotely.

A further advantage of the present invention is that it provides detailed information of a sort that would be essentially impossible to discern even if all of the relevant raw data were otherwise readily available.

Still another advantage of the inventive system is that it organizes the configuration and operational parameter information into a usable format to aid a network manager in managing and tuning the network array.

Yet another advantage of the present invention is that it is generally automatic, gathering the raw data and determining from such data the required information without substantial operator intervention.

And yet another advantage of the present invention is that the response time for a transaction on a distributed application may be measured without the need for altering or modifying in any way the current network applications.

These and other objects and advantages of the present invention will become clear to those skilled in the art in view of the description of the best presently known mode of carrying out the invention and the industrial applicability of the preferred embodiment as described herein and as illustrated in the several figures of the drawing.

DETAILED DESCRIPTION OF THE INVENTION

The best presently known mode for carrying out the invention is a computer hardware/software combination functioning within a larger computer network. The predominant expected usage of the inventive network management means and method is in the managing of large computer networks where a network manager might not have any way of knowing of changing network conditions and configurations were it not for some sort of remote monitoring system.

Figure 1:
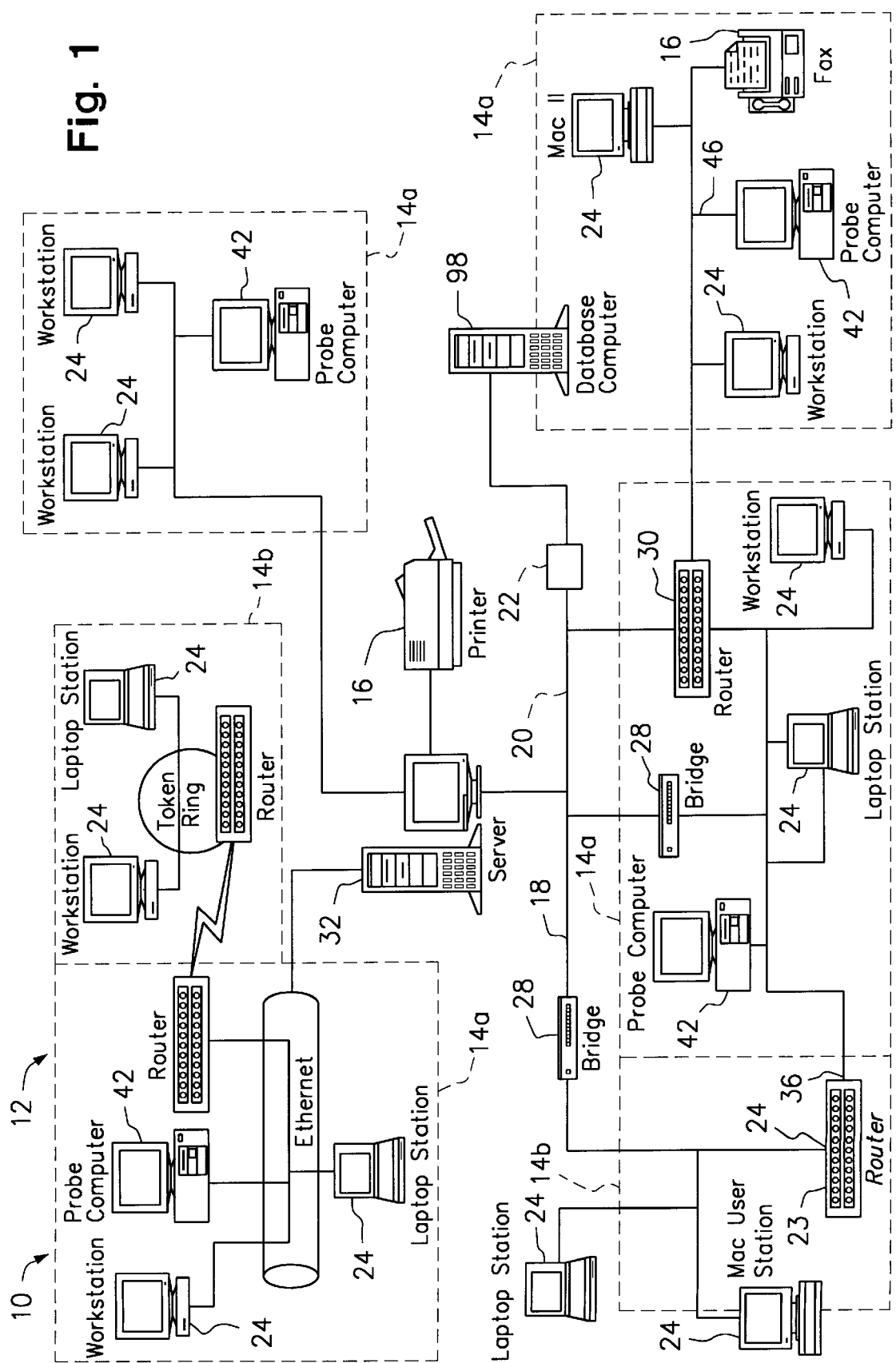
FIG. 1 is a diagrammatic representation of a typical computer network having integrated therein an example of the inventive network monitoring and management system.

A preferred, typical embodiment of the inventive network monitoring and management system is depicted in diagrammatic form in FIG. 1, and is designated globally by the general reference character 10. The monitoring and management system 10 is shown as being integrated into a computer network 12. Although it appears to be complex, in light of the network systems of even a few years ago, the relatively typical network 12 shown in FIG. 1 is a somewhat simple one compared to those in which the inventive network monitoring system 10 is actually intended to be used. The computer network 12 is shown to be an overall array which includes a number of discreetly identifiable branch arrays, referred to for simplicity as LANs 14, although it is recognized that each of the branches may not fit the classic definition of a Local Area Network, since each does not include a server component. For simplicity of nomenclature, and due to the fact that most of the properties of these branches comport with those associated with Local Area Networks, in this discussion, they are considered to be LANs, each of which may be considered to be separately identifiable. The nature of the LANs 14 may differ widely, but a typical example might be a local area network in a single location which forms a part of a global, geographically dispersed overall network 12.

The typical computer network 12 will include a variety of conventional network components 16, which are interconnected in a complex data path 18, which may be logically broken down into discrete segments 20 intermediate logically adjacent network components 16. Information, control signals and other forms of digital data are delivered to and through the network components 16 in the form of discrete data packets 22 which travel along the segments 20 of the data path 18. The data packets 22, as one skilled in the art will recognize, are quantities of data adhering to a specific format such as are commonly used in the transmission of data through the network 12. The fact that all of the data packets 22 may be in the same format, and the implications of this fact, will be discussed in greater detail hereinafter.

Each node of interest to the network and the network manager is provided with a network address 23 which is unique to that particular location in the computer network array 12. The network address 23 for each location is ordinarily set up during configuration of the array 12 and reflects a particular point along the LANs 14. Ordinarily, each network component 16 will have a single network address which is used by the system in order to locate that particular component 16.

Typical network components 16 include user stations 24, which may be in the form of workstations, desktop personal computers, laptops or any other station at which a user may interface with the network 12. In addition to the user stations 24, the network components 16 will typically include transmission units 26, bridges 28, routers 30 and servers 32. Each of the network components 16 will ordinarily include at least one network board 34, or the equivalent thereof, each of which will have assigned thereto at least one board address 36. The board address 36 is the typical information which is utilized within the network to identify and locate (logically) the particular network component 16. In most network schemes, bridges 28 are transparent to operation and are not directly accessed by the network 12. As such, these components do not need, and are not ordinarily assigned, either a network address 23 or a board address 36. On the other hand, it is not uncommon for a single network component (particularly a router 30 or a server 32) to have a single network address 23 while having two (or more) associated board addresses 36. In most network configurations, the components situated at junctions between (or among) multiple LANs 14 will have unique board addresses 36 for each branch LAN 14.

One skilled in the art will recognize that the configuration of the network 12 of FIG. 1 describes only one of many ways in which such a network might be arranged, and the network 12 is intended to be illustrative only.

According to the best presently known embodiment 10 of the present invention, the computer monitoring and management system 10 is provided with a sampling assembly for gathering and summarizing network information, and an analysis assembly for taking the information gathered by the sampling assembly and organizing and delivering it to the network administrator in a usable form.

The illustrated embodiment of the sampling and analysis assemblies includes a plurality (four, in the simplified example of FIG. 1) of probe computers 42. Both the sampling and analysis assemblies are implemented as described herein using the conventional components of probe computers 42. The probe computers 42 are generally allocated one per LAN 14, although some LANs may not be so equipped. This is shown in FIG. 1 in a first type of branch LAN 14a which has a probe computer 42 situated in association therewith, while a second type of branch LAN 14b is not so equipped. The probe computer 42, which might be a user station 24 as well, if sufficiently fast and powerful to multitask the duties, is ordinarily passive with respect to the operation of the network 12. The typical probe computer 42 includes memory storage in which information may be stored for subsequent retrieval. This memory storage is sometimes referred to as a "buffer" and can be in any media form, although the usual form will be a conventional hard disk drive of the computer unit. Each probe computer 42 is logically connected to the network 12 by a probe connection 46 by which it intercepts a data packet 22 traveling along the data path 18 and the associated segment 20 and "copies" it as a captured packet 22' to the probe computer 42 without interrupting the flow of the original data packet 22 to its intended destination. This is accomplished by a capture routine 48 in the associated software of the probe computer 42. The captured packet 22' is then processed by a probe builder routine 50 (see FIG. 2) into a corresponding probe object 52 containing information correlating to the content of the captured packet 22'.

Figure 2:
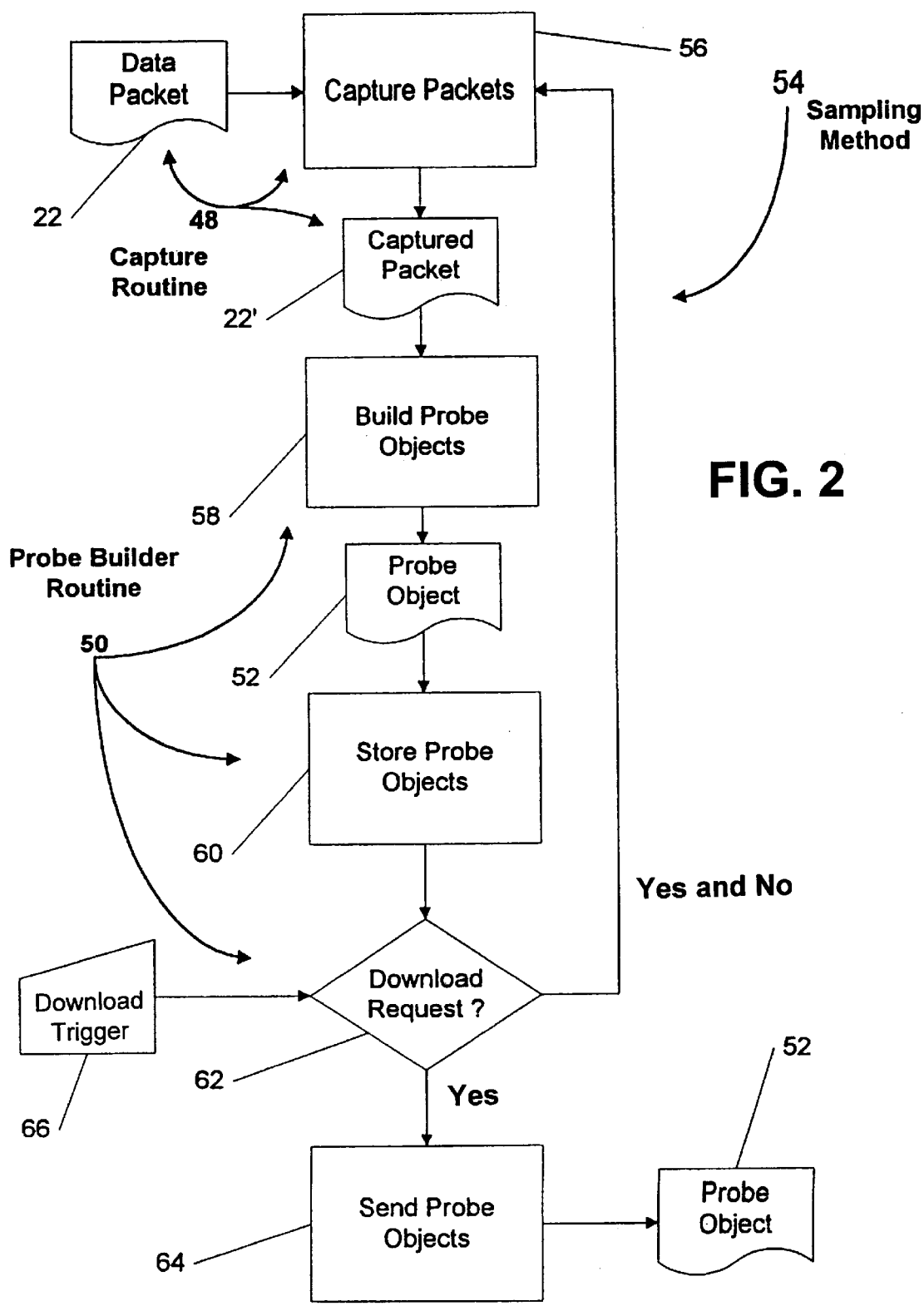
FIG. 2 is a flow diagram of a probe capture and build method according to the present invention.

FIG. 2 is a block schematic diagram of the operation of the sampling assembly as it would be typically in the form of a sampling method 54 implemented in software and including at least the capture routine 48 and the probe builder routine 50. In the best presently known embodiment 10 of the present invention, the sampling method 54 is implemented by the probe computers 42 (FIG. 1) although, where it would not interfere with other functions, it is not impossible that the sampling method 54 could be implemented by one of the user stations 24 or other computer (not shown) connected to the branch 16.

In the best presently known embodiment 10 of the present invention, the sampling method 54 performs a capture packet 56 function for a defined interval of two seconds. This time might be varied in some applications, although it is important that the time be long enough to capture at least a significant portion of inquiries, along with any responses thereto because, as will be discussed in more detail hereinafter, response times from the server 32, and the like, are an important aspect of the present invention. It should be noted that, although the actual time interval of the capture packets 56 function might be varied, it is important that it be time based, as will be appreciated in light of the discussion, hereinafter, of the analysis of the data obtained thereby. In the capture packet 56 function, the captured packets 22' are captured into a buffer (in the best presently known embodiment of the invention 10, the memory of the individual probe computer 42 acts as the buffer). In the preferred embodiment 10 of the method, the capture packets 56 function is a "promiscuous" packet capture which writes the captured packets 22' (each truncated to 192 bytes) into a "round-robin" type of buffer. This results in a plurality (assuming an active network) of captured packets in the buffer at any given time. The duration of the sampling interval is reduced in those circumstances in which a buffer is not available in which to store the captured packets 22'.

After the capture packets function 56, a build probe objects function 58, and then a store probe objects function 60 are performed. The build probe objects function 58 and the store probe objects function 60 can take as long as several seconds and are not time dependent—the length of time required being a function of the amount of data to be processed and the processing speed of the probe computer 42. Following the store probe objects function 60, a download request 62 decision function branches the sampling method 54 such that all responses begin the sampling method 54 anew with the capture packets 56 function, while a yes ("Y") response branches to a send probe objects function 64, after which the sampling method 54 begins anew with the capture packets 56 function. The "Yes" response will be triggered when a download trigger signal 66 is sent to the probe computer 42 from the analysis assembly or, depending on programming, upon the completion of a timed cycle for downloading the probe objects 52.

Figure 3:
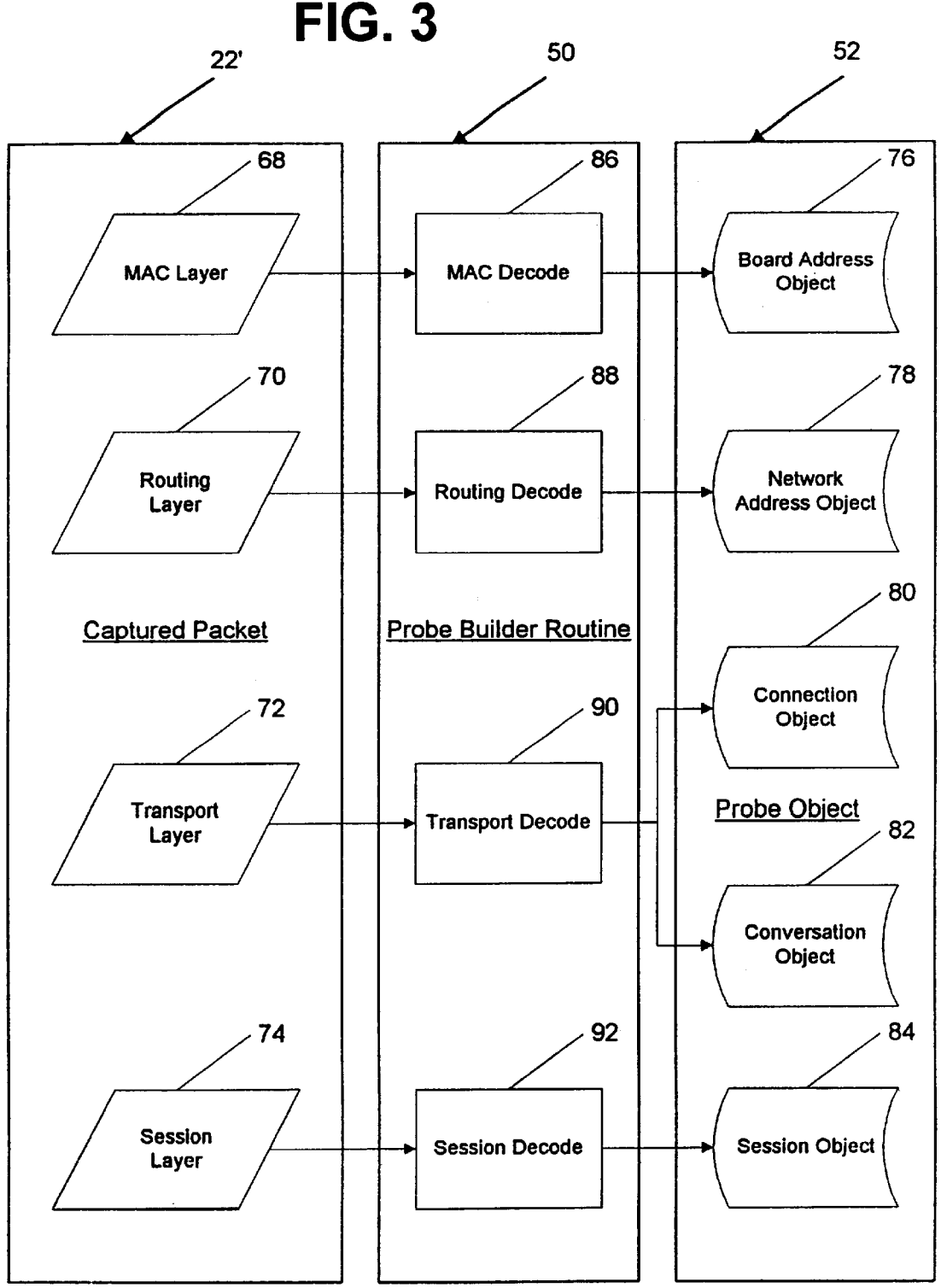
FIG. 3 is a detailed diagram of the 'build probe objects' method of FIG. 2, including a diagrammatical view of a typical probe object which is built by the method.

FIG. 3 is a more detailed representation of the build probe objects 58 function of FIG. 2, showing the manner in which the selected information in a single captured packet 22' is transformed into a corresponding probe object 52. This illustrates how the information in various layers of the typical captured packet 22' are converted by various substeps of the build probe objects subroutine 58 to form various subcomponents of the typical corresponding probe object 52, which is then forwarded to the analysis assembly.

As discussed above in the description of the Prior Art (see Table A), the OSI model for data packets 22 on a network provides several layers of information. The build probe objects subroutine 58 operates on these layers to extract information which is valuable to include in the probe object 52 and which relates to the operation and structure of the network 12. Under the preferred embodiment, only four of the seven layers of the OSI model are of significant interest, so the build probe objects subroutine 58 only operates on these layers (with minor exceptions). Specifically, the physical layer (1) is on an electrical level and is of little value in analysis while the highest two application levels (6 and 7) are so esoteric and inconsistent in usage in various circumstances that the nature of information to be gleaned therefrom would be suspect, at best, although certain aspects thereof might be of interest and are considered by the subroutine as being a part of the fifth level. Accordingly, only the second through fifth (with some extension) levels on the model are processed by the inventive method.

Within the captured packet 22' the position of level 2 is identified as a MAC (Medium Access Control) layer 68, level 3 is identified as a routing layer 70, level 4 is identified as a transport layer 72 and level 5 (the lowest application-specific level with some possible input from levels 6 and 7) is called out herein as a session layer 74.

The corresponding components of the probe object 52 are identified, respectively as a board address object 76 corresponding to the MAC layer 68, a network address object 78 corresponding to the routing layer 70, a connection object 80 and a conversation object 82 corresponding to the transport layer 72, and a session object 84 corresponding to the session layer 74.

Within the overall build probe objects routine 50, a MAC decode routine 86 operates on the MAC layer 68 to create the board address object 76. The MAC decode routine 86 interprets data on the OSI level 2, which is in standardized protocol format, as discussed previously herein in relation to RMON. The information in OSI level two, the most relevant portions of which are the source and ultimate destination addresses for the packet 22', not only provides the information needed to contribute to the board address object 46, but also contains information to inform as to which protocol format applies to the data which follows within the packet 22'. In particular, the board address object 76 is accessed though a hash table based on the level 2 layer information and will be suitable for identifying the "name" of the source or destination component 16 and the type (i.e. whether a router 30 or a server 32).

Following the MAC decode routine 86 in the build probe objects 58 function is a routing decode routine 88, which creates a network address object 50. The routing decode routine 88 uses source and destination address data which would be classified by OSI as being in level 3 to ascertain a network address 23' (for either or both of the source and the destination) to contribute to the network address object 78. Depending on the depth of information included in the level 3 portion of the captured packet 22', the hash table extraction yields a network address object 78 which has a name and a type of the "station(s)" involved and which may also be linked to a specific board address 36' if there is evidence in the data to the effect that the network address 23' and the board address 36' belong to the same station.

Following the routing decode routine 88 in the build probe objects 58 function is a transport decode routine 90, which manipulates the data in the transport layer 72 (level 4) to create both the connection object 80 and the conversation object 82. These two objects, which are closely related, deal with information on the "endpoints" relevant to the particular packet 22'. That is, rather than dealing with the nearest intermediate board address 36 in the data path 18, these objects include information on the ultimate source and destination of the captured packet 22'.

In order to create the connection object 80, the transport decode routine 90 utilizes a hash table based on a pair of matched endpoint addresses appearing in the same captured packet 22'. These can either be a pair of network addresses 23 or a pair of board addresses 36'. The connection object 80 is an identified and separately "named" (numbered) object representing a link between two defined endpoints. For example, a particular captured packet 22' may involve a print spool request from Joan's PC (24) to a printer control server (32), designating an item for printing on an associated dot matrix printer. A connection object 80 would then be created and identified ("named") which would indicate a "connection" between Joan's PC and the printer server. A later captured packet 22' could include a further print request traveling along the same path 18 as before from Joan's PC to the printer server, with either the same designated printer, or, say, a laser printer. In this case a separately named connection object 80, with essentially identical content, other than the name, would be created to memorialize a second "connection" between the same two endpoints. Sorting and counting of these objects is performed at the level of the database builder aspects of the analysis assembly, so each of these separate objects is simply stored in the buffer until called for.

The conversation object 82 is linked and associated with one or more connection objects 80. The conversation object 82 is a dynamic object which will vary in content depending on changes in the connection objects and particularly on changes in the data path 18. The conversation object 82 will include the addresses of each of the endpoints which define the object, the bucket designation for each activity, a byte count for each activity and the addresses of the boards which are on the pathway 18 contiguously on either side of the particular probe computer 42. The conversation object becomes a "permanent" which is dynamically modified to reflect changes in the intermediate board addresses and the bucket designations. Overall, the conversation object 82 associated with a particular pair of endpoints will be a composite analog of the activity, over time, between those endpoints, while each connection object 80 is associated with a single packet 22'.

As part of the transport decode routine 90, each time a connection becomes accessed a new connection object 80 is created and the build probe object routine 58 will automatically compute server response time. The overall routine 50 will also periodically (or upon occurrence of defined conditions) move the server response time parameter data to the network object address 78.

Following the transport decode routine 90, a session decode routine 92 operates on the data in the session layer (OSI level 5, with some potential data gleaned from levels 6 and 7) to create the session object 84. The session decode routine 92, in the preferred embodiment 10, is reserved for creation of a class of objects which may be predefined for a particular purpose, or user defined after delivery. Since the session layer 74 includes primarily application specific information, the user may wish to select particular information from this category (e.g. "print" commands or "download" requests above a defined minimum size) in order to track the network usage. This sort of information may be useful for a variety of purposes, including optimization. This is by no means an exhaustive list of the types of information which might be contained in the probe object 52. Indeed, it is anticipated that more information will be added in the future.

The various routines which make up the overall probe object builder routine 58 are significantly protocol dependent and the precise operation may vary depending on the particular protocol utilized in the packet 22. However, one skilled in the art will recognize that it will be a relatively simple matter to branch control to a protocol dependent subroutine based upon the identification of the appropriate protocol in the MAC layer decode routine 86, as discussed previously herein. There are sufficiently few commonly used protocols that it will not be difficult to write the appropriate branch subroutine for each.

Returning to the flow chart of FIG. 2, following the build probe objects routine 56, the store probe objects routine 60 then stores the accumulated probe object 52 (FIG. 3) to the memory storage of the probe computer 42 (into the "buffer"). Then if the download request 66 decision function is positive (that is, if a request has been received from the analysis assembly or a download trigger 66 of some other form has been provided), the accumulated probe objects 52 are sent as a group to the analysis assembly, where they are then processed in accordance with an analysis routine 94, as illustrated in the flow chart diagram of FIG. 4. The probe object builder routine 56 will continually operate to accumulate probe objects 52 in the buffer for future downloads, unless interrupted by the user or a special circumstance command from the system. It is envisioned in the preferred embodiment 10 that there will also be a "purge buffer" function which will operate periodically (e.g. every 24 hours) to clear the buffer of stored probe objects 52 which are too old or "stale" to be of continuing interest to the system 10. Upon downloading, the stored probe objects 52 are accumulated and arranged in a probe file 93 which sorts and groups the objects for further processing by the analysis assembly.

Figure 4:
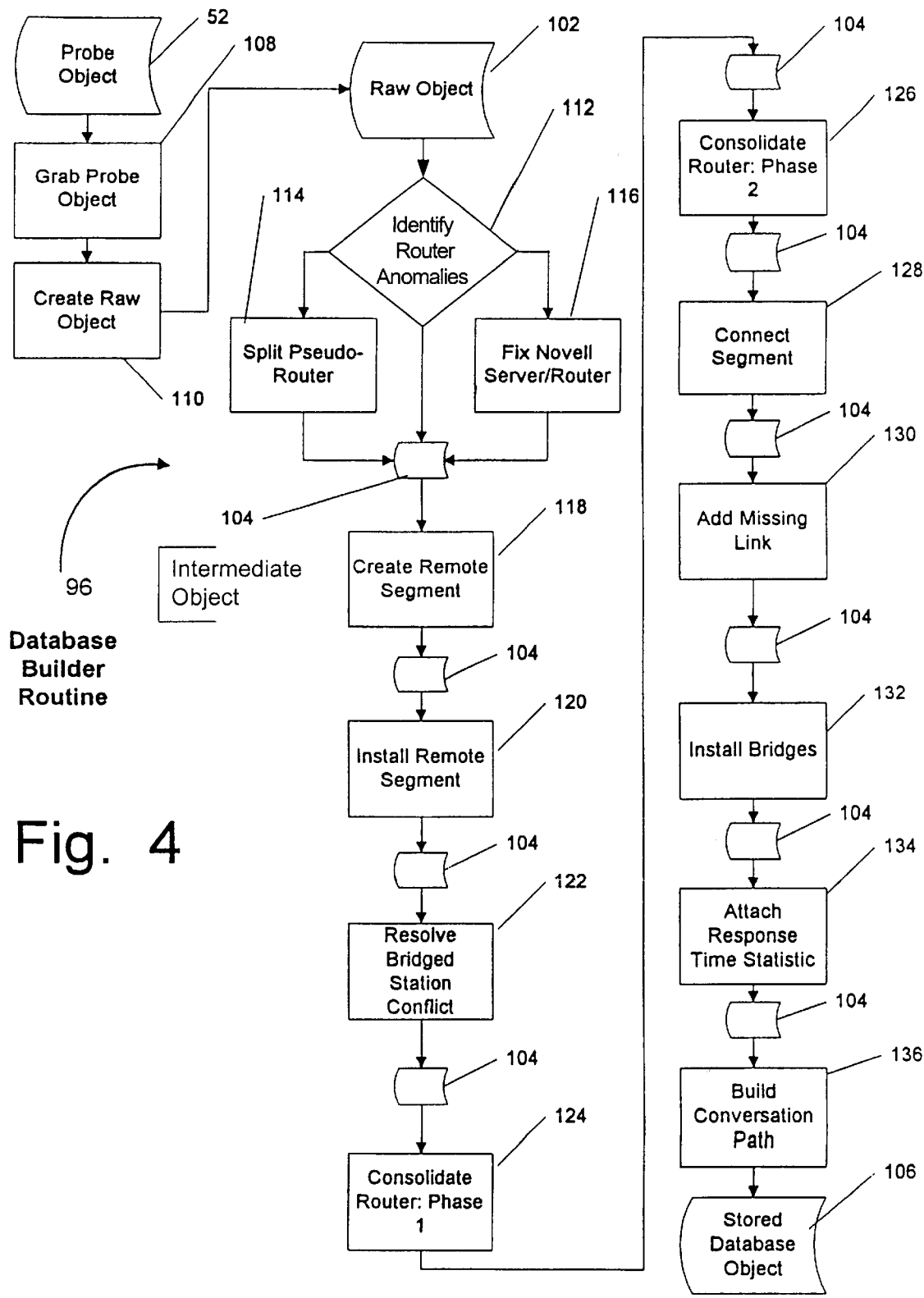
FIG. 4 is a detailed diagram of a 'data base builder' method according to the present invention.

FIG. 4 is a flow diagram of the analysis routine 94, the most prominent portion thereof being a data base builder routine 96. As previously discussed herein, upon the request of a user (or, alternatively, automatically at a predetermined time of the day or the like) the probe computers 42 will each transmit all of the respective accumulated probe objects 52 to the analysis assembly, the most significant hardware portion thereof being defined as a database builder computer 98. Thereafter the data base builder computer 98 will initiate the data base builder routine 96. In the best presently known embodiment 10 of the present invention, the data base builder routine 96 will operate on the downloaded probe objects 52, individually and collectively to create a database 99 which may be accessed and manipulated to reflect, in a usable form, information about the overall structure and operation of the network 12. The purpose of the data base builder routine 96 is to merge the data from a large plurality of operations of the sampling assembly into a unique network representation.

The primary object of the database (db) builder routine 96 is to create a plurality of database (db) objects 100 which are analogous to key data about the network 12. During the process of the database builder routine 96 the db objects 100 are in various forms, including a raw object 102, a variety of intermediate objects 104 and a "final" stored db object 106. The stored database objects 106 continue to remain malleable even after the completion of the routine, since the network 12 is subject to changes in configuration and operation and it is desirable to periodically (or effectively constantly) update the objects in the overall database (see FIG. 5 and the associated discussion) in order to keep the information current.

As illustrated in a flow diagram in FIG. 4, the db builder routine 96 initiates with a grab probe object step 108 which accesses the stored probe objects 52 which have been downloaded from the probe computers 42 and selects a particular probe object 52 upon which to operate. After downloading, the probe objects 52 have been stored in the database computer 98 in the probe file 93 in a fashion which facilitates logical and rapid access and selection, so the grab probe object step 108 may access the queue and immediately select an appropriate and relevant one. The probe object 52, once grabbed, is then converted into a raw db object 102 by a create raw object step 110, which has arranged data relating to the various stations on the network 12 with respect to relationships between boards 34 and board addresses 36, network addresses 23, routers 30 and servers 32.

The raw object 102 is then subjected to an identify router anomalies step 112 which deals with specific known anomalies in protocol and transmission characteristics which might adversely effect analysis and lead to false characterization of objects. In the event that no anomalies are detected, then the raw object will not be modified and the resulting intermediate db object 104 will be identical to the raw db object 102. However, if anomalies are detected, additional alternative process steps are initiated which modify the data to correct the anomalies. Two of these steps which are included in the preferred embodiment of the db builder routine 96 are a split pseudo-router step 114 and a fix Novell™ server/router step 116.

The split pseudo router step 114 is necessary because some routers fail to send RIP (Router Information Protocol) packets. As a result, this type of router 30 can be detected based on too many associated network addresses 23. The identify router anomalies step 112 will detect that multiple network addresses 23 appear to be associated with a single station and the split pseudo router step 114 will then tag this station as being a router 30.

With networks this situation is compounded because servers will often also have extraneous addresses. Novell™ servers advertise router capabilities in addition to server capabilities. The router capabilities may be real (as when a server 32 is operating as a router 30 as well) or may be fake (as when the signal is simply a factor of the protocol, and not a representation of actual capability). A telltale indication of this type of anomaly is that the "hop count" is off by one unit from expectation. In order to provide homogeneous data for further steps, therefore, the identify router anomalies step 112 will detect this sort of anomaly and the fix Novell™ server/router step 116 will normalize the hop count data and rectify the content of the intermediate db object 104 such that it confirms to other protocols.

Next, the db builder routine 96 initiates a create remote arrays/segments step 118. This operation is utilized to postulate the existence of LANs 14' upon which no probe computer 42 is located. This process involves virtual attachment of the remote branch 14' to a known branch 14 which does include a probe computer 42, based upon network address 23 analysis. Remote stations (network components 116) are then "built" or "installed" on the created branch 14' by an install remote stations step 120, based on known data of remote network addresses 23' relating to the particular router 30' used for access and an active conversation (from the conversation object 82 data). Remote stations not involved in the particular conversation in the probe object 52' will be assigned locations by this step. This step will also "locate" inactive stations, although this will only occur when such inactive stations were previously created, as a result of being active in previous conversation objects 82.

The next process step is in the nature of a resolve bridge stations conflict step 122. This occurs when stations (identical board addresses 36) are detected on different branches of the network 16. When this occurs, it may be assumed that the branches 14 are connected by a bridge 28, which (as discussed above) is transparent to the packets 22, since bridges 28 are not assigned network addresses 23 and will not have individual board addresses 36. A heuristic analysis is utilized to "guess" the identify of the branch 14 upon which the station is actually located, and a location is assigned as a result of this guess.

Since routers 30 will have different addresses (both network and board) for each branch 14 to which they are connected, a true picture of the overall network must include some method of resolving these multiple address locations into a single station. For this purpose, a consolidate routers: Phase 1 step 124 and a consolidate routers: Phase 2 step 126 are included in the db builder routine 96. The phase 1 step 124 invokes reasoning based on the standard router query under the SNMP (Simple Network Management Protocol). This involves address analysis in which a single location appears to "own" and advertise overlapping addresses on different branches. When this occurs, it is a relatively safe assumption that the station is a single component 16 and that it is a router 30. The phase 2 step 126 includes hop count analysis to postulate router identity. In this case, for example, if a station (appearing from other data to be a router 30 address) has an address on one branch LAN 14 and another station (appearing from other data to be a router 30) has an address on a different branch LAN 14, and either (preferably both) show a RIP table entry to the other with a hop count of 1, then it is assumed that these are one and the same station. Further, if a hop count of 1 is found between a particular identified router 30" and a segment 20 on a branch LAN 14, this situation is identified and a connection is assumed between that router 30' and the associated segment 20. In this manner, as a result of the consolidate router steps: Phase 1 124 and Phase 2 126, the routers on the network 12 are consolidated into single stations and the array diagram is simplified.

Sometimes, router connections to LANs 14 and segments 20 and other connections necessary to the conversation are still unresolved at this stage. In order to rectify this, an add missing link step 130 is performed to force a link (assume a connection) to complete the pathway 18. This occurs when no complete pathway appears to support known conversations.

In order to provide additional information which is of value to the manager, the process then performs an attach response time step 134 which attaches response time information from the probe object 52 to the server address portion of the db object 104. This attachment is a temporary, with the data later being associated with the station, instead of the address.

Finally, after all of the conversions, assumptions and building steps, the db builder routine 96 performs a build conversation path step 136, which insures that paths are completed to cover all conversations. The steps, in total, should assure that all conversations found on the network 16 have a pathway defined. After this final step, the stored database object 106 is complete (although subject to updating) and is ready for storage in the analysis database 99 for use by the manager in mapping and analyzing the network 16.

Figure 5:
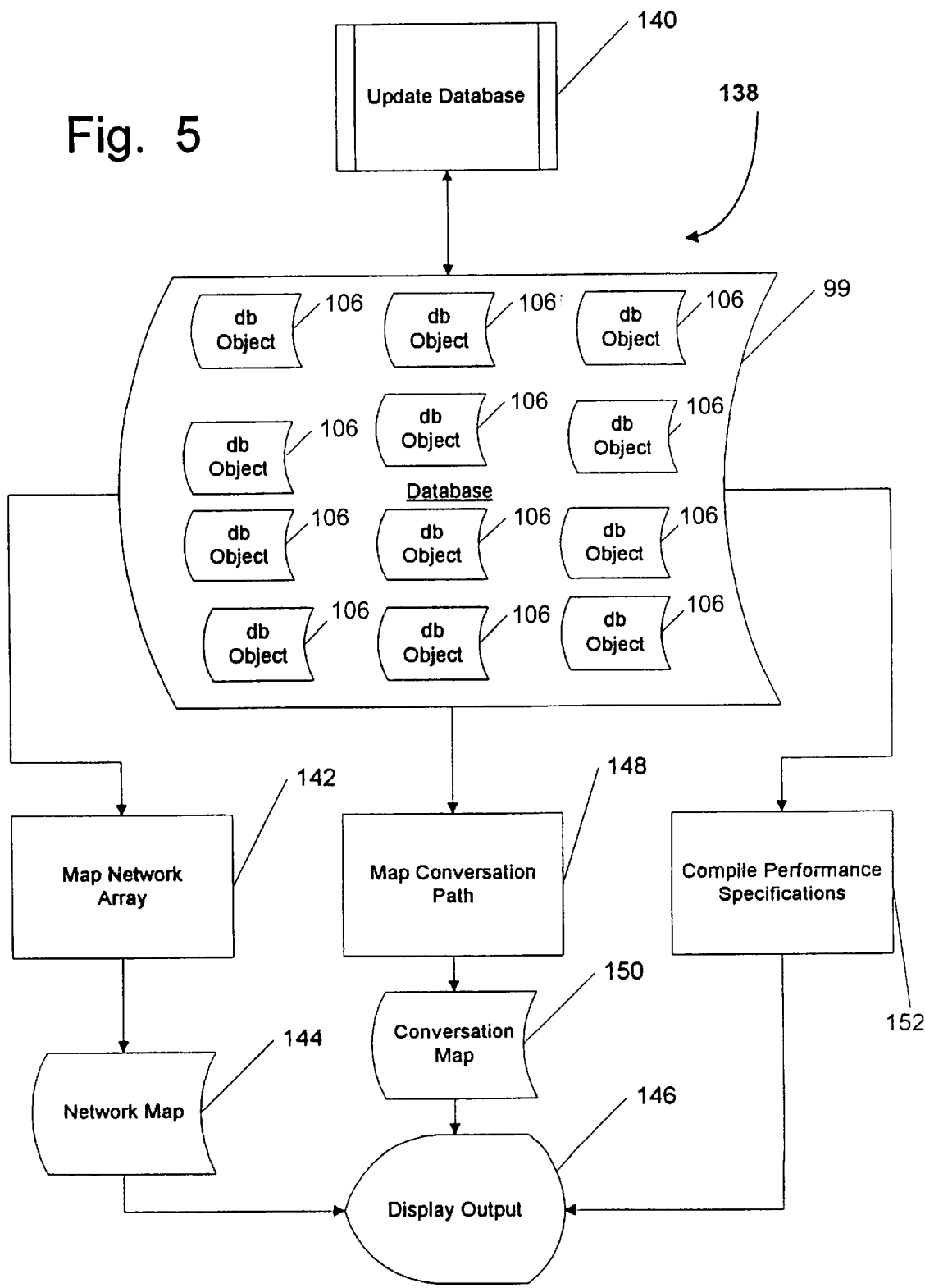
FIG. 5 illustrates a database management operation in which the information gathered and organized by the inventive system may be utilized by the network manager.

FIG. 5 shows a conceptual diagram of the database 99, with some examples of operations which may be performed on it by a database management system 138 in order to permit the network manager to understand and optimize the network 16. This illustration shows some of the operations which might be performed on the database 99, including an organized plurality of stored db objects 106, to provide useful information.

One of the operations, intended to keep the data current, is an update database routine 140. The update db routine 140 may be triggered manually, be subject to a time trigger, or may be a continual process, at the choice of the programmer and user. This process utilizes the sampling assembly 38 and the analysis assembly 40 to provide fresh probe objects 52 for modifying existing db objects 106 and creating new db objects 106 when there are changes in the topology or contact of the network 12. Basically, the update database routine 140 involves repetition of the build db routine 96 and replacing older versions of db objects 106 with current versions.

Another common operation will be the use of the compiled information in the database 99 to provide a visual representation of network topology. This is accomplished by a map network array process 142 which maps the entire structure of the network 12. A full network map 144 may be created thereby which can then be shown on a screen, saved to a file, or printed to hard copy by a display output process 146. The network map 144 may be of great value in understanding and tuning the network 12.

Another item of useful information relates to the particular pathways over which conversations between two or more selected network components or stations 16 occur during operation. This information may be gleaned from the database 99 by a map conversation process 148. Thus function may be utilized to select desired stations and to utilize the database 99 to create a conversation path map 150 which shows the actual path(s) between those stations which have been observed by the system 10. Ordinarily, this conversation path map 150 will include the LANs 14 and network components 16 along the pathway in order to analyze for possible tuning to improve performance or to troubleshoot problems. The output from the conversation map process 148 may also be directed to the display output process 146.

One further type of output which might be desired is a compilation of performance data (speed of operation, response times of selected components, and the like). This can also be extracted from the database 99 by a compile performance specifications process 152, the output from which can also be displayed or stored by the display output process 146.

Programmers of reasonable skill in the art, provided with the above diagrams and explanations, will be able to create various modules to perform the steps involved and to reproduce the operation of the preferred system 10. The inventor has utilized C as a programming language for the software components, but the operation is not language dependent and others may prefer different platforms. The inventor has also utilized IBM and compatible PC units as hardware processing units, but this is also easily subject to modification.

An implementation of the sampling assembly and the analysis assembly is commercially produced by Compuware Corporation of Los Gatos, Calif., under the trademark "Ecoscope". However, it is recognized that the particular code is, to a degree, a matter of personal preference, and many variations might be utilized with similar efficacy.

Various modifications may be made to the invention without altering its value or scope. For example, the order of some of the steps may be altered, the nature of the precise information included in the probe object may be modified to fit desired output requirements, and the mechanisms for the probes and storage of data may differ. New technological breakthroughs are expected to provide additional options for usage, while retaining the essential utility of the invention.

In a preferred embodiment, transaction response time is measured for an application transaction initiated by a user on the user workstation 24, for example, in the computer network 12 shown in FIG. 1. A purpose of such a transaction may be to acquire data from a database stored on the server 32. Preferably, the transaction response time is measured using, for example, the network monitoring and management system 10. One skilled in the art will recognize, however, that the method for measuring the transaction response time according to the present invention can be performed on other network monitoring and management systems and is not limited to the network monitoring and management system 10 described herein.

In particular, when a user sends a transaction across the network 12, such as a data request for data stored on the server 32, data packets containing session layer data (OSI level 5 or greater) will travel across the network 12 between the workstation 24 and the server 32. When the transaction is complete and there are no other transactions currently pending between the workstation 24 and the server 32, none of the data packets travelling between the workstation 24 and the server 32 will contain session layer data. In other words, packets containing session layer data only travel between the workstation 24 and the server 32 while the transaction between the workstation 24 and the server 32 is pending. In a preferred embodiment, this fact is used to advantageously calculate the transaction response time in a non-intrusive manner.

Figure 6:
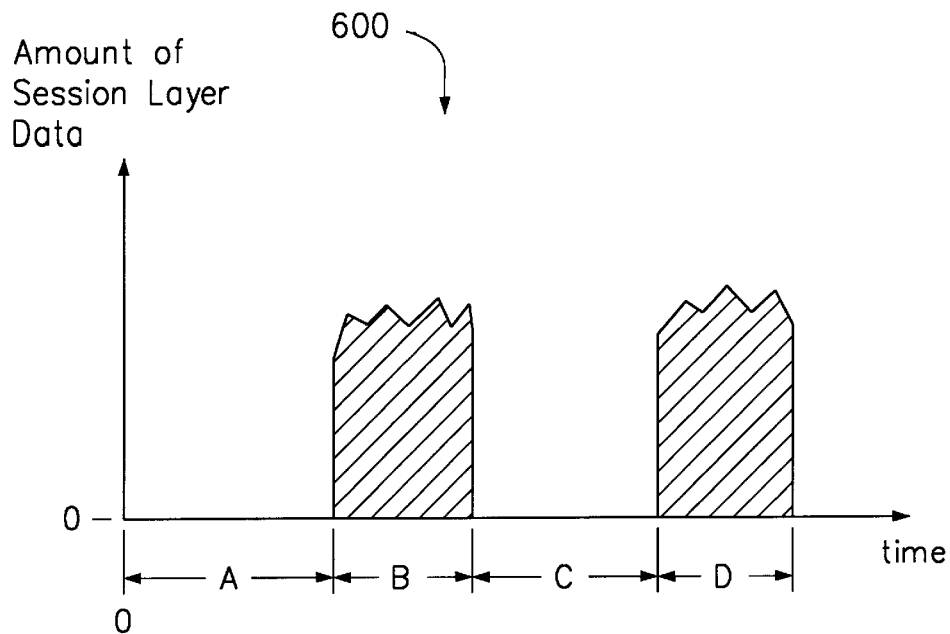
FIG. 6 is a plot illustrating exemplary amounts of session layer data travelling on the network between the workstation and the server as a function of time to aid in describing a transaction response time measurement method in accordance with the present invention.

To illustrate this concept, a plot 600 illustrating exemplary amounts of session layer data travelling on the network 12 between the workstation 24 and the server 32 as a function of time is shown in FIG. 6. The reference letter "A" indicates a period of time during which there is no session layer data travelling between the workstation 24 and the server 32. The absence of session layer data during this period of time indicates that no transaction is pending between the workstation 24 and the server 32, such as before a data request is made. In contrast, the reference letter "B" indicates a period of time during which various amounts of session layer data are travelling between the workstation 24 and the server 32. The presence of session layer data during this period of time indicates that a transaction between the workstation 24 and the server 32 is pending, such as processing of the data request. The period of time indicated by the reference letter "B" is therefore the transaction response time for this particular transaction. Similarly, "C" indicates a period of time during which no transaction is pending, and "D" indicates a transaction response time for another transaction.

Figure 7:
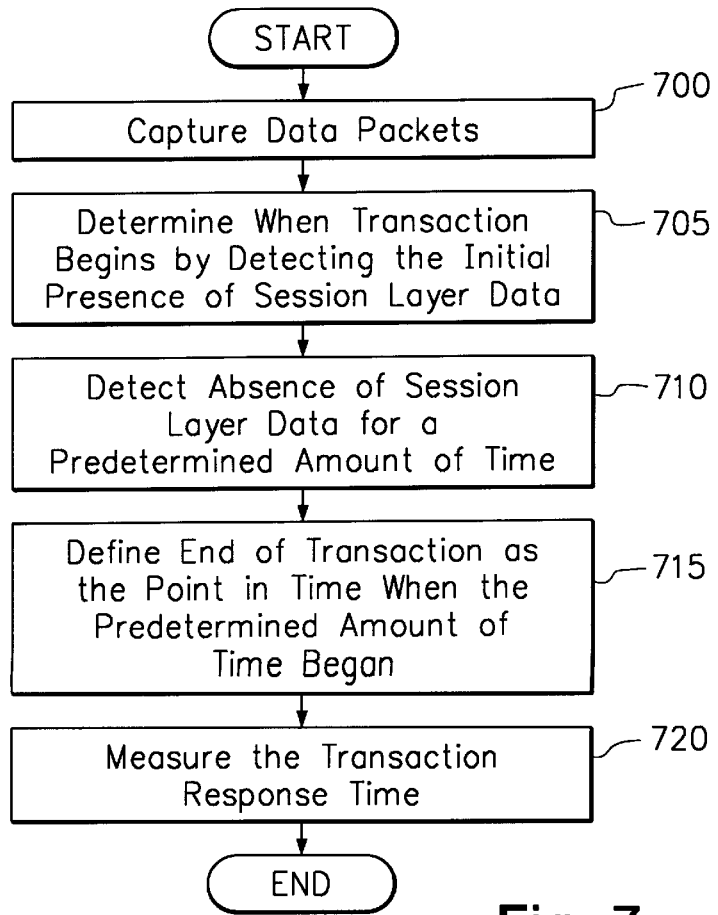
FIG. 7 is a flow chart illustrating a transaction response time measurement method in accordance with the present invention.

To determine the "B" and "D" transaction response times, a routine which analyzes data packets captured by the capture packet function 56 of FIG. 2 is used. As illustrated by the flow chart of FIG. 7, the system 10 captures 700 data packets and then determines 705 when the transaction in question begins. This is accomplished by detecting the initial presence of a data packet containing session layer data. Next, the routine detects 710 an absence of session layer data contained within successive captured data packets for a predetermined amount of time. Preferably, the predetermined amount of time is two seconds. This amount of time is indicated by the letter "C" in FIG. 6. The routine then defines 715 the end of the transaction as the point in time at which the predetermined amount of time began, e.g. the start of the period indicated by the letter "C" in FIG. 6. The amount of time for processing the transaction is then measured 720 as the difference between the beginning and the end of the transaction. Thus, by detecting the presence or absence of session layer data travelling between the workstation 24 and the server 32, the method according to the present invention determines the transaction response time without modifying or re-compiling the applications on the network. Detection of the presence or absence of session layer data is accomplished in a conventional manner. In a preferred embodiment, the session layer data is detected by conventionally using the OSI model's description of the sequence of data information within each packet.

Figure 8:
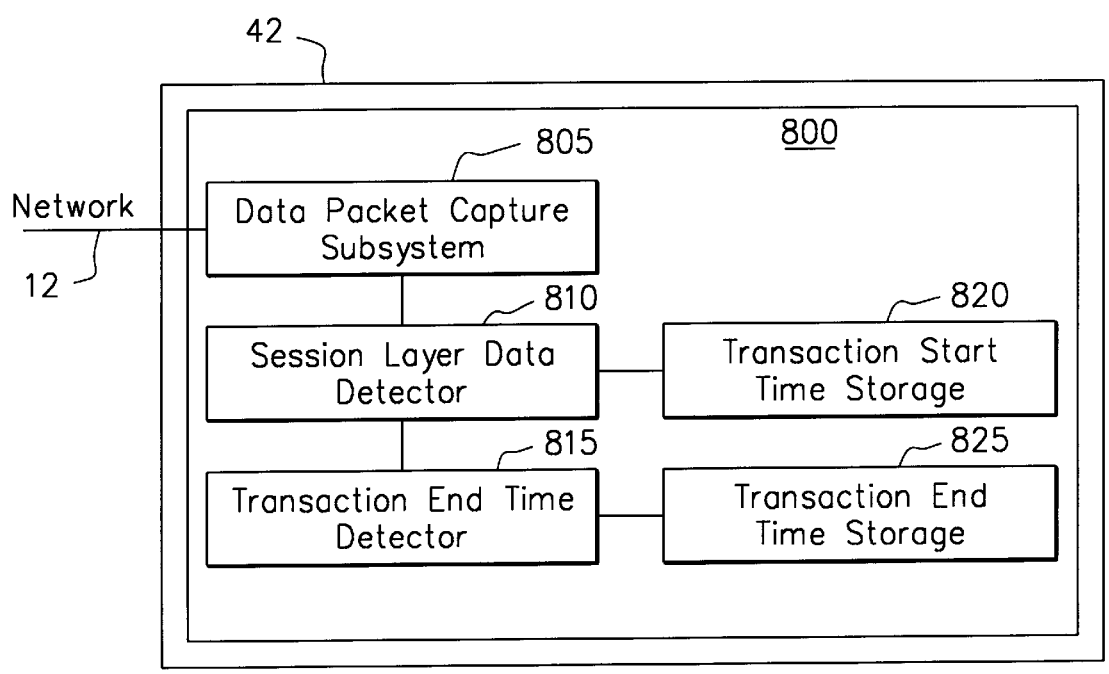
FIG. 8 is a block diagram of a system for performing a transaction response time measurement in accordance with the present invention.

In FIG. 8 there is shown a block diagram of a system 800 for performing a transaction response time measurement in accordance with the present invention. The system 800 is preferably located within each of the probe computers 42 of the network 12. The system 800 comprises a data packet capture subsystem 805, a session layer data detector 810, a transaction end time detector 815, a transaction start time storage device 820, and a transaction end time storage device 825. The data packet capture subsystem 805 preferably performs the capture packet function 56 as described above. The session layer data detector 810 is operatively coupled to the data packet capture subsystem 805 and, as described above, determines 705 when the transaction in question begins by detecting the initial presence of a data packet containing session layer data. The transaction start time storage device 820 is operatively coupled to the session layer data detector 810 and stores a value indicating when the transaction in question began. The transaction end time detector 815 is operatively coupled to the session layer data detector and, as described above, detects 710 an absence of successive data packets containing session layer data for a predetermined amount of time. The transaction end time storage device 825 is operatively coupled to the transaction end time detector 815 and stores a value indicating when the transaction in question ends. The transaction response time is calculated using the values stored in the start time and end time storage devices 820, 825. In a preferred embodiment, the transaction response time calculation is performed conventionally by the system 800.

In a preferred embodiment, the session layer data detector 810 and the transaction end time detector 815 are implemented as computer programs stored on a memory device of each of the probe computers 42. The transaction start time and end time storage devices 820, 825 are preferably conventional computer memory modules used for storing digital data values.

All of the above are only some of the examples of available embodiments of the present invention. Those skilled in the art will readily observe that numerous other modifications and alterations may be made without departing from the spirit and scope of the invention. Accordingly, the above disclosure is not intended as limiting and the appended claims are to be interpreted as encompassing the entire scope of the invention.

INDUSTRIAL APPLICABILITY

As may be seen from the above discussion, the inventive system 10 is very flexible and can be easily adapted for use under a wide variety of conditions and network structures to provide an equally wide variety of usable outputs. It is not especially hardware dependent although it is necessary to utilize probe computer units 42 which are capable of running the associated software to perform the sampling procedure and a database computer 98 (or multiples thereof) which can run the analysis routines at a reasonable speed such that the output generated thereby is usable in making rapid adjustments to the network.

A typical utilization of the inventive network monitoring and management system 10 would be its incorporation into an extensive existing network 12 where problems are being encountered in performance. A network manager may wish to install a system 10 in order to get a hold on the manner in which the network 12 is arrayed and how it is performing, in order to rework configurations, repair or replace logjam components, avert bottlenecks, and otherwise manage and tune the network 12.

In order to accomplish this, the manager will estimate the number of LANs 14 in the network 12 and select the number of desired sampling assemblies accordingly. It is recommended that the ratio of branches 14 including sampling assemblies to the total number of LANs should be about 1 to 4 or 5 so that a typical network having approximately ten LANs 14 would be best served by incorporation of two to three probe computers 42 along separate LAN branches. It is recognized that an otherwise underutilized user station 24 may be programmed with the probe routine 46 and function as a probe computer 42, but it is recommended for serious operation that dedicated probe computers 42 be utilized. A single database computer 98 will be sufficient for most purposes, although the user may wish to include multiple units for a particularly large network 12 or in situations where multiple, remotely situated, managers are involved in the analysis.

Once attached to the network 12, the units will function according to the programming and should be completely transparent to operation of all other features of the network 12. Except for the physical presence of the units, the existence and incorporation of the network monitoring and management system 10 will not be noticeable to the general user, only to the network manager. In initial operation, the system 10 will require a period of time to sample sufficient data in order to build a working database 99. In a typical network, including about ten LAN branches and forty stations, it is expected that an interval of approximately five minutes will be sufficient in order to establish a database 99 which has sufficient data integrity to be valuable in tuning the network 12, although very useful information is available almost immediately after beginning operation.

Once the database 99 is established the database management system 138 of FIG. 5 may be utilized to map and analyze performance and configurations in order to modify and optimize the network 12. Since, unless disabled the sampling assembly will be continually providing new probe objects 52 and the analysis assembly will continually enhance and update the database 99, the database management 138 will continually provide fresh and current information on the precise state of the network 12. This facilitates efficient management and optimization.

In light of all of the above, it may be seen that the network monitoring and management system 10 of the present invention is adaptable for use on a wide variety of networks to provide dependable and fast information in useful output formats. The network manager will be able to use the system 10 to make the manager's job more efficient and pleasurable and to obtain customized output. For all of these reasons, and others which become apparent upon installation and usage, it is expected that the present invention will have industrial applicability and commercial utility which are both widespread in acceptance and long in duration.

I claim:

1. A method for measuring an amount of time for processing a transaction between a first node and a second node on a computer network, the method comprising:

establishing a direct logical connection between the first and the second node;

determining a beginning of the transaction in response to a presence of session layer data in data packets that only travel between the first and second node using the direct logical connection;

determining an end of the transaction in response to an absence of session layer data in data packets that only travel between the first and second node using the direct logical connection for a predetermined amount of time; and measuring the amount of time for processing the transaction in response to determining the beginning and the end of the transaction.

2. The method of claim 1, wherein the predetermined amount of time is approximately 2 seconds.

3. The method of claim 1, wherein the first node is a network server and the second node is a network client.

4. The method of claim 3, wherein the transaction is between a network server portion of an application distributed over the computer network and a network client portion of the distributed application.

5. A method for measuring an amount of time for processing a transaction between a first node and a second node on a computer network, the method comprising:

establishing a direct logical connection between said first and said second node;

examining data packets that only travels between the first node and the second node over said direct logical connection;

determining a beginning of the transaction in response to detecting an initial presence of a first one of said data packets containing session layer data;

determining an end of the transaction in response to detecting an absence of successive ones of data packets containing session layer data for a predetermined amount of time; and measuring the amount of time for processing the transaction in response to determining the beginning and the end of the transaction.

6. The method of claim 5, wherein the predetermined amount of time is approximately 2 seconds.

7. The method of claim 5, wherein the first node is a network server and the second node is a network client.

8. The method of claim 7, wherein the transaction is between a network server portion of an application distributed over the computer network and a network client portion of the distributed application.

9. A method for determining an end of a transaction, the transaction being processed between a first node and a second node on a computer network, the method comprising:

establishing a direct logical connection between said first and said second node;

examining data packets that only travels between the the first node and the second node over said direct logical connection;

determining a beginning of the transaction in response to detecting an initial presence of a first one of said data packets containing session layer data; and determining an end of the transaction in response to detecting an absence of successive ones of data packets containing session layer data for a predetermined amount of time.

10. The method of claim 9, wherein the predetermined amount of time is approximately 2 seconds.

11. The method of claim 9, wherein the first node is a network server and the second node is a network client.

12. The method of claim 11, wherein the transaction is between a network server portion of an application distributed over the computer network and a network client portion of the distributed application.

13. A system for measuring an amount of time for processing a transaction between nodes on a computer network, the system comprising:

a first node;

a second node, coupled by a direct logical connection to the first node;

a session layer data detector configured to detect session layer data in data packets traveling between the first node and the second node of the computer network exclusively over said logical connection; and a transaction end time detector, operatively coupled to the session layer data detector configured to determine the end of the transaction in response to the session layer data detector detecting an absence of session layer data for a predetermined amount of time.

14. The system of claim 13, further comprising:

a transaction start time storage device operatively coupled to the session layer data detector configured to store a value indicating when the transaction begins; and a transaction end time storage device operatively coupled to the transaction end time detector configured to store a value indicating when the transaction ends.

15. The system of claim 13, further comprising a data packet capture subsystem coupled to the computer network to intercept data packets travelling between the first node and the second node of the computer network and to copy data contained within the packets for detection of session layer data by the session layer data detector.

16. The system of claim 13, wherein the predetermined amount of time is approximately 2 seconds.

* * * * *